(12) United States Patent
Oohira et al.

(10) Patent No.: US 8,711,306 B2
(45) Date of Patent: Apr. 29, 2014

(54) LIQUID CRYSTAL DISPLAY DEVICE

(75) Inventors: Eiji Oohira, Mobara (JP); Yuka Kuwajima, Mobara (JP)

(73) Assignee: Japan Display Inc., Tokyo (JP)

( * ) Notice: Subject to any disclaimer, the term of this patent is extended or adjusted under 35 U.S.C. 154(b) by 137 days.

(21) Appl. No.: 13/491,827

(22) Filed: Jun. 8, 2012

(65) Prior Publication Data
US 2012/0314158 A1  Dec. 13, 2012

(30) Foreign Application Priority Data
Jun. 9, 2011  (JP) .................................. 2011-129264

(51) Int. Cl.
*G02F 1/1333* (2006.01)
*G02F 1/1335* (2006.01)

(52) U.S. Cl.
USPC .................. 349/110; 349/58; 349/15; 349/65

(58) Field of Classification Search
CPC ............ G02F 1/1335; G02F 1/133512; G02F 1/133528; G02F 1/133553; G02F 1/133555; G02F 1/157; G02F 1/1333; G02F 1/133308; G02F 1/13338; G02F 1/1336; G02F 1/133608; G02F 1/133615; G02F 2001/133388; G02F 2001/133317; G02F 2001/133331; G02F 2001/133325; G02F 2201/08; G02F 2202/28; G02F 2203/09; G02B 5/003; G02B 27/22; G02B 27/225; C09J 5/00; H04N 13/0409; H04N 13/0413; H04N 13/00; H04N 2213/001

USPC ............. 349/15, 58, 110, 65, 12, 61, 62, 122, 349/96, 113, 56, 84; 345/173, 87; 359/609, 359/892, 227; 362/632–634, 97.1, 19, 362/249.01, 97.2; 428/76; 156/60, 145
See application file for complete search history.

(56) References Cited

U.S. PATENT DOCUMENTS

| 7,973,873 B2 * | 7/2011 | Ha et al. .......................... 349/58 |
| 2010/0079698 A1 | 4/2010 | Matsumoto et al. |
| 2010/0283924 A1 * | 11/2010 | Lee et al. ........................ 349/15 |

FOREIGN PATENT DOCUMENTS

| JP | 2004-294862 | 10/2004 |
| JP | 2010-078898 | 4/2010 |

* cited by examiner

*Primary Examiner* — Thoi Duong
(74) *Attorney, Agent, or Firm* — Antonelli, Terry, Stout & Kraus, LLP.

(57) ABSTRACT

A liquid crystal display device includes a light transmitting substrate arranged on a parallax barrier liquid crystal panel; a light blocking frame formed on the light transmitting substrate; and a frame positioned in a state where the frame faces an end surface of a light guide plate. The light blocking frame is formed to cover a portion of the frame arranged adjacent to the light guide plate and a portion of the frame outside the portion The frame includes a body made of a material which reflects some of light incident on the body and allows some of the light to pass through the body, and a light blocking film formed on a portion of a surface of the body on a liquid-crystal-display-panel side which projects from the liquid crystal display panel while avoiding a surface of the body which faces the light guide plate.

6 Claims, 4 Drawing Sheets

LIQUID CRYSTAL DISPLAY DEVICE

CROSS-REFERENCE TO RELATED APPLICATION

The present application claims priority from Japanese application JP2011-129264 filed on Jun. 9, 2011, the contents of which are hereby incorporated by reference into this application.

BACKGROUND OF THE INVENTION

1. Field of the Invention

The present invention relates to a liquid crystal display device.

2. Description of the Related Art

Conventionally, there has been known a liquid crystal display device where a transparent substrate referred to as a front panel is mounted on a liquid crystal display panel (JP 2010-78898 A). In such a liquid crystal display device, an opaque region (printed portion) is formed on a peripheral portion of the front panel so that the periphery of a display region of the liquid crystal display panel is concealed by the printed portion.

Recently, there has been developed a product which satisfies a demand for a stereoscopic display of an image, and as a medium-sized to small-sized apparatus such as a mobile phone or a portable digital assistant, there has been known a liquid crystal display device which includes a parallax barrier liquid crystal panel which allows a viewer to view a stereoscopic image with his naked eyes (JP 2004-294862 A).

When the liquid crystal display panel and the parallax barrier liquid crystal panel are arranged in an overlapping manner with each other, a front panel is arranged away from the liquid crystal display panel and hence, there may be a case where the periphery of a display region is visually recognized when the liquid crystal display panel is viewed obliquely through the front panel. Particularly, when a region around the display region (a picture frame) of the liquid crystal display panel is narrow, a frame which supports the liquid crystal display panel is visually recognized. This frame receives light from a light guide plate of a backlight so that the frame is formed into a waveguide thus functioning as a light emitting body. When light emitted from the frame is visually recognized, the display quality of an image is deteriorated.

SUMMARY OF THE INVENTION

It is an object of the present invention to provide a liquid crystal display device which can prevent the deterioration of display quality of an image.

(1) According to one aspect of the present invention, there is provided a liquid crystal display device including: a liquid crystal display panel which has a display screen and a back surface on a side opposite to the display screen; a parallax barrier liquid crystal panel which is arranged on a display screen side of the liquid crystal display panel in an overlapping manner; a light transmitting substrate which is arranged on the parallax barrier liquid crystal panel in an overlapping manner on a side opposite to the liquid crystal display panel; a light blocking frame which is formed on the light transmitting substrate in a state where the light blocking frame surrounds a display region of the liquid crystal display panel; a backlight which is arranged on a back surface side of the liquid crystal display panel and includes a light guide plate; and a frame which is positioned in a state where the frame faces an end surface of the light guide plate in an opposed manner, supports an edge portion of the liquid crystal display panel on the back surface side of the liquid crystal display panel, and includes a portion projecting outwardly from the liquid crystal display panel, wherein the light blocking frame is formed so as to cover a portion of the frame which is arranged adjacent to the light guide plate and a portion of the frame outside the portion, and the frame includes a body made of a material which reflects some of light incident on the body and allows some of the light to pass through the body, and a light blocking film which is formed at least on a portion of a surface of the body on a liquid-crystal-display-panel side which projects from the liquid crystal display panel while avoiding a surface of the body which faces the light guide plate in an opposed manner. According to the present invention, light emitted from the frame can be blocked by the light blocking film and hence, the deterioration of display quality of an image can be prevented.

(2) In the liquid crystal display device having the above-mentioned constitution (1), the body may include a projecting portion projecting upwardly from the surface of the body which supports the liquid crystal display panel on a portion thereof projecting from the liquid crystal display panel, the projecting portion may be positioned on a side of the liquid crystal display panel, and the light blocking film may be formed in a region which includes a side surface and an upper surface of the projecting portion.

(3) In the liquid crystal display device having the above-mentioned constitution (1) or (2), the light blocking film may be formed on the whole body while avoiding the surface of the body which faces the light guide plate in an opposed manner.

(4) In the liquid crystal display device having any one of the above-mentioned constitutions (1) to (3), the liquid crystal display device may further include a light blocking double-sided adhesive tape for adhering the liquid crystal display panel to the frame, and the light blocking film may be formed in an overlapping manner with the double-sided adhesive tape.

(5) In the liquid crystal display device having any one of the above-mentioned constitutions (1) to (3), the liquid crystal display device may further include a light blocking double-sided adhesive tape for adhering the liquid crystal display panel to the frame, and the light blocking film may be formed while avoiding the overlapping of the light blocking film with the double-sided adhesive tape.

(6) In the liquid crystal display device having any one of the above-mentioned constitutions (1) to (5), one polarizer may be used in common as a polarizer of the liquid crystal display panel on a parallax barrier liquid crystal panel side and as a polarizer of the parallax barrier liquid crystal panel on a liquid crystal display panel side, and the light blocking frame is formed in a state where the light blocking frame covers a fringe portion of the polarizer which is used in common.

DETAILED DESCRIPTION OF THE INVENTION

Figure 1:
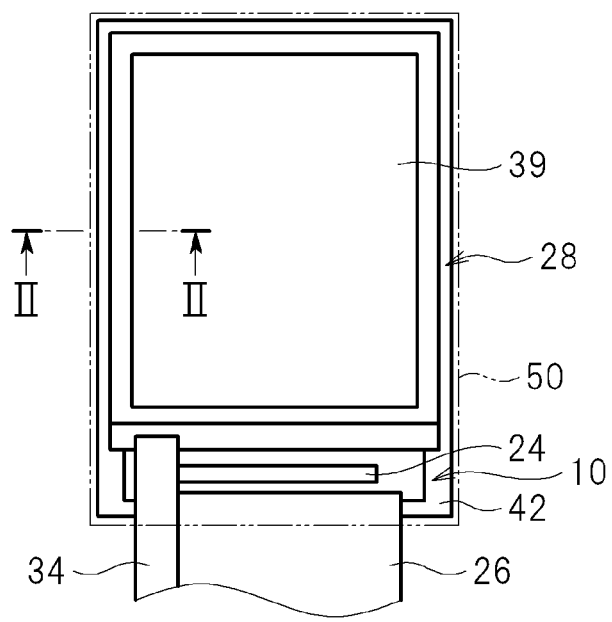
FIG. 1 is a plan view showing a liquid crystal display device according to an embodiment of the present invention.
Figure 2:
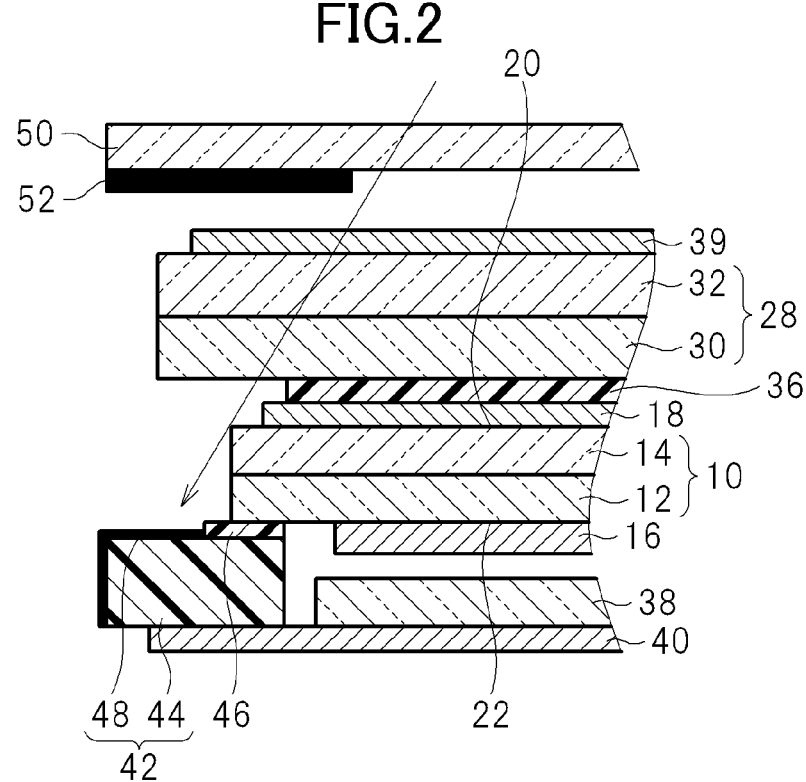
FIG. 2 is an enlarged cross-sectional view of the liquid crystal display device shown in FIG. 1 taken along a line II-II.

Hereinafter, an embodiment of the present invention is explained in conjunction with drawings. FIG. 1 is a plan view showing a liquid crystal display device according to the embodiment of the present invention. FIG. 2 is an enlarged cross-sectional view of the liquid crystal display device shown in FIG. 1 taken along a line II-II.

Figure 3:
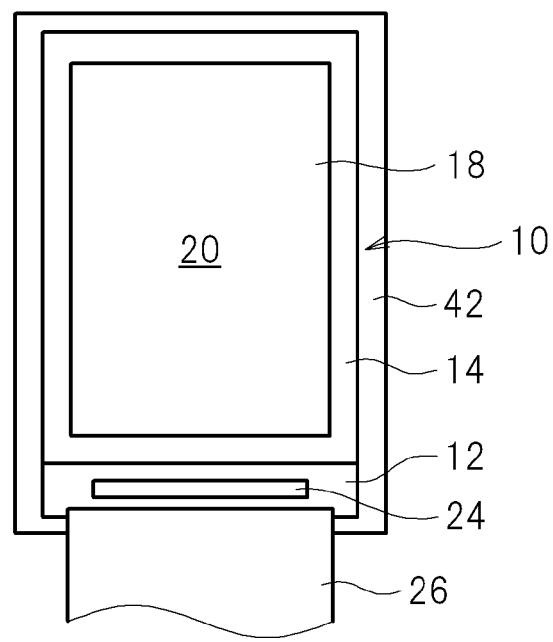
FIG. 3 is a plan view showing a liquid crystal display panel.

The liquid crystal display device includes a liquid crystal display panel 10. FIG. 3 is a plan view showing the liquid crystal display panel 10. The liquid crystal display panel 10 may preferably be a TN (Twisted Nematic) liquid crystal display panel, an STN (Super Twisted Nematic) liquid crystal display panel, a VA (Vertical Alignment) liquid crystal display panel, an IPS (In-Plane Switching) liquid crystal display panel or the like. However, the structure and a liquid crystal drive method of the liquid crystal display panel 10 are not limited. The liquid crystal display panel 10 includes a pair of transparent substrates 12, 14 made of glass or the like, and liquid crystal not shown in the drawing is sandwiched between both substrates. One substrate 12 is a TFT (Thin Film Transistor) substrate, and the other substrate 14 is a color filter substrate. To surfaces of the pair of substrates 12, 14 on sides opposite to each other, polarizers 16, 18 are adhered respectively. The liquid crystal display panel 10 has a display screen 20 on which an image is displayed and a back surface 22 which is arranged on a side opposite to the display screen 20. An integrated circuit chip 24 is mounted on the substrate 12, and a flexible printed circuit board 26 is mounted on the substrate 12. The flexible printed circuit board 26 has a wiring pattern not shown in the drawing.

The liquid crystal display device according to this embodiment can perform a stereoscopic image display. To be more specific, the liquid crystal display device allows a viewer to visually recognize different two-dimensional images on his left and right eyes respectively so that the brain of the viewer builds up a three-dimensional space based on these two two-dimensional images. Accordingly, an image for a left eye and an image for a right eye are displayed on the liquid crystal display panel 10.

Figure 4:
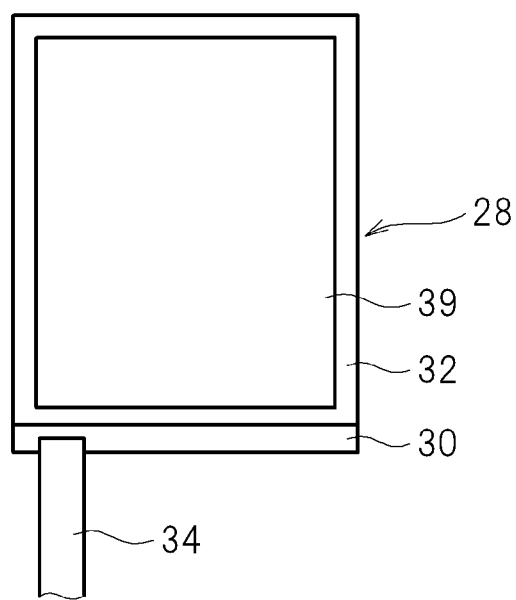
FIG. 4 is a plan view showing a parallax barrier liquid crystal panel.

The liquid crystal display device includes a parallax barrier liquid crystal panel 28. FIG. 4 is a plan view showing the parallax barrier liquid crystal panel 28. The parallax barrier liquid crystal panel 28 is provided for allowing a viewer to stereoscopically view an image with his naked eyes by separating an image for a left eye and an image for a right eye displayed on the liquid crystal display panel 10 from each other using a parallax barrier method. The parallax barrier method is a method by which only an image for a left eye is projected on a left eye and only an image for a right eye is projected on a right eye by overlapping a filter having vertical stripes (parallax barrier) to the display screen 20 for displaying an image.

The parallax barrier liquid crystal panel 28 may be a TN (Twisted Nematic) liquid crystal panel, an STN (Super Twisted Nematic) liquid crystal panel, a VA (Vertical Alignment) liquid crystal panel, an IPS (In-Plane Switching) liquid crystal panel or the like. However, the structure and a liquid crystal drive method of the parallax barrier liquid crystal panel 28 are also not limited. The parallax barrier liquid crystal panel 28 also includes a pair of transparent substrates 30, 32 made of glass or the like, and liquid crystal not shown in the drawing is sandwiched between both substrates 30, 32. One substrate 30 is a TFT (Thin Film Transistor) substrate. A flexible printed circuit board 34 is mounted on the substrate 30. The flexible printed circuit board 34 has a wiring pattern not shown in the drawing.

The parallax barrier liquid crystal panel 28 is arranged on a display screen 20 side of the liquid crystal display panel 10 in an overlapping manner. The parallax barrier liquid crystal panel 28 and the liquid crystal display panel 10 are adhered to each other with an adhesion layer 36 interposed therebetween. It is preferable that the adhesion layer 36 has optical transmissivity and be transparent.

A polarizer 39 is attached to the substrate 32 of the parallax barrier liquid crystal panel 28 on a side opposite to the liquid crystal display panel 10. On the other hand, the adhesion layer 36 is adhered to the substrate 30 of the parallax barrier liquid crystal panel 28 on a liquid crystal display panel 10 side. The adhesion layer 36 is adhered to the polarizer 18 of the liquid crystal display panel 10 on a parallax barrier liquid crystal panel 28 side. The polarizer 18 functions not only as a polarizer of the liquid crystal display panel 10 on a parallax barrier liquid crystal panel side but also as a polarizer of the parallax barrier liquid crystal panel 28 on a liquid crystal display panel 10 side. That is, one polarizer 18 is used in common by the liquid crystal display panel 10 and the parallax barrier liquid crystal panel 28.

As shown in FIG. 2, a light guide plate 38 is arranged on a back surface 22 side of the liquid crystal display panel 10 in an overlapping manner. The light guide plate 38 converts light incident on the light guide plate 38 from a point light source not shown in the drawing into light for a surface light source. A reflection film 40 is arranged on the light guide plate 38 on a side opposite to the liquid crystal display panel 10 so that light irradiated downwardly (to a side opposite to the liquid crystal display panel 10) from the light guide plate 38 is reflected on the reflection film 40 and is returned to the light guide plate 38. A backlight is formed by adding a light source, an optical film and the like not shown in the drawing to the light guide plate 38 and the reflection film 40. The backlight is arranged on the back surface 22 side of the liquid crystal display panel 10.

The liquid crystal display device includes a frame 42. The frame 42 supports an edge portion of the liquid crystal display panel 10 on a back surface 22 side. The frame 42 includes a portion projecting outwardly from the liquid crystal display panel 10. The liquid crystal display panel 10 is adhered to the frame 42 using a light-blocking double-sided adhesive tape 46. A body 44 of the frame 42 is formed by molding using a resin such as a polycarbonate resin or an ABS resin. The body 44 of the frame 42 is made of a material (for example, a white material) which reflects some of light which the body 44 receives and allows some of light to pass therethrough.

The frame 42 is positioned such that the frame 42 faces an end surface (an end surface on a side opposite to an end surface on which light is incident from the light source not shown in the drawing) of the light guide plate 38 in an opposed manner. Accordingly, light which advances in the inside of the light guide plate 38 is irradiated from the end surface of the light guide plate 38, and advances in the direction toward the frame 42. Here, some of the light is reflected on a surface of the body 44 of the frame 42, and some of the light passes through the inside of the body 44. Light reflected on the surface of the body 44 returns to the light guide plate 38 and hence, the brightness of the backlight can be enhanced.

A black light blocking film 48 is formed on the body 44 of the frame 42, for example. Accordingly, light which passes through the inside of the body 44 is blocked by the light blocking film 48 so that the light cannot be irradiated from the body 44. The light blocking film 48 may have light absorbing property or light reflecting property. The light blocking film 48 may be formed by printing or by coating. The light blocking film 48 is formed on the body 44 while avoiding a surface of the body 44 which faces the light guide plate 38 in an opposed manner and hence, the light blocking film 48 does not impede a function of the body 44 that the body 44 reflects light from the light guide plate 38. The light blocking film 48 is formed at least on a portion of a surface of the body 44 on a liquid-crystal-display-panel-10 side which projects from the liquid crystal display panel 10. In the example shown in FIG. 2, the light blocking film 48 is formed in such a manner that the overlapping of the light blocking film 48 with the double-sided adhesive tape 46 is avoided.

A light transmitting substrate 50 is arranged on the parallax barrier liquid crystal panel in an overlapping manner on a side opposite to the liquid crystal display panel 10. A light blocking frame 52 is formed on the light transmitting substrate 50 in a state where the light blocking frame 52 surrounds a display region of the liquid crystal display panel 10. The light blocking frame 52 is formed so as to cover a fringe portion of the polarizer 18 used in common by the liquid crystal display panel 10 and the parallax barrier liquid crystal panel 28 from above. The light blocking frame 52 is formed so as to cover a portion (a portion arranged adjacent to the light guide plate 38) of the frame 42 from above. The light blocking frame 52 is also formed so as to cover another portion (a portion arranged outside the portion arranged adjacent to the light guide plate 38) of the frame 42 from above.

The frame 42 is concealed by the light blocking frame 52 when the liquid crystal display device is viewed in the direction orthogonal to the light transmitting substrate 50. However, as indicated by an arrow in FIG. 2, when the liquid crystal display device is viewed obliquely with respect to the light transmitting substrate 50, the frame 42 is viewed. In this case, when light is emitted from the frame 42, the emission of light influences a display quality of an image. According to this embodiment, light emitted from the frame 42 is blocked by the light blocking film 48 and hence, the deterioration of display quality of an image can be prevented.

Figure 5:
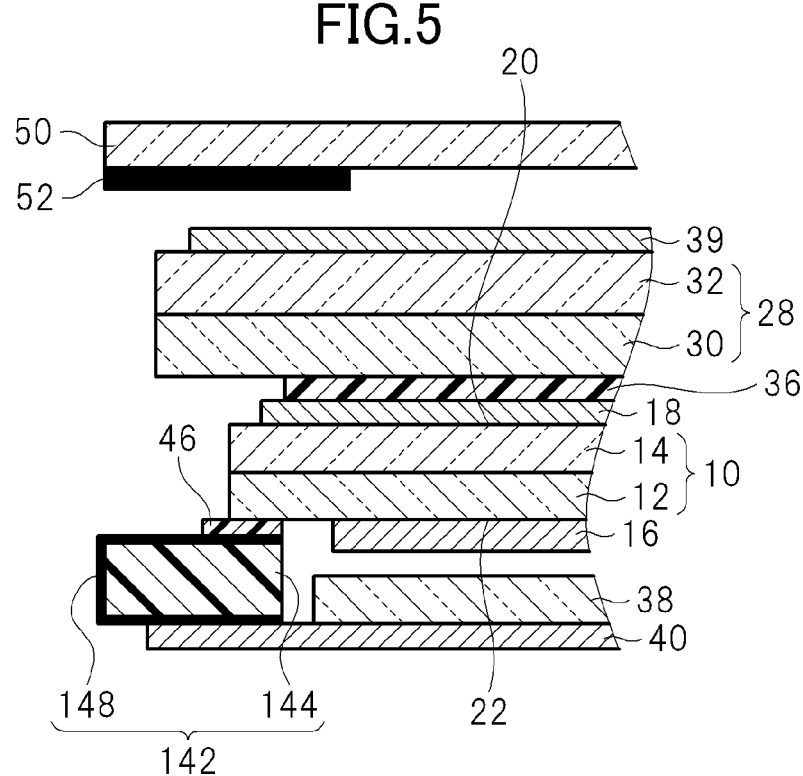
FIG. 5 is a view for explaining a modification 1 of the liquid crystal display device according to the embodiment of the present invention.

FIG. 5 is a view for explaining a modification 1 of the liquid crystal display device according to the embodiment of the present invention. In this modification, a light blocking film 148 is formed on a whole body 144 while avoiding a surface of the body 144 which faces the light guide plate 38 in an opposed manner. The liquid crystal display panel 10 is adhered to a frame 142 using the light blocking double-sided adhesive tape 46. The light blocking film 148 is arranged on the double-sided adhesive tape 46 in an overlapping manner.

Figure 6:
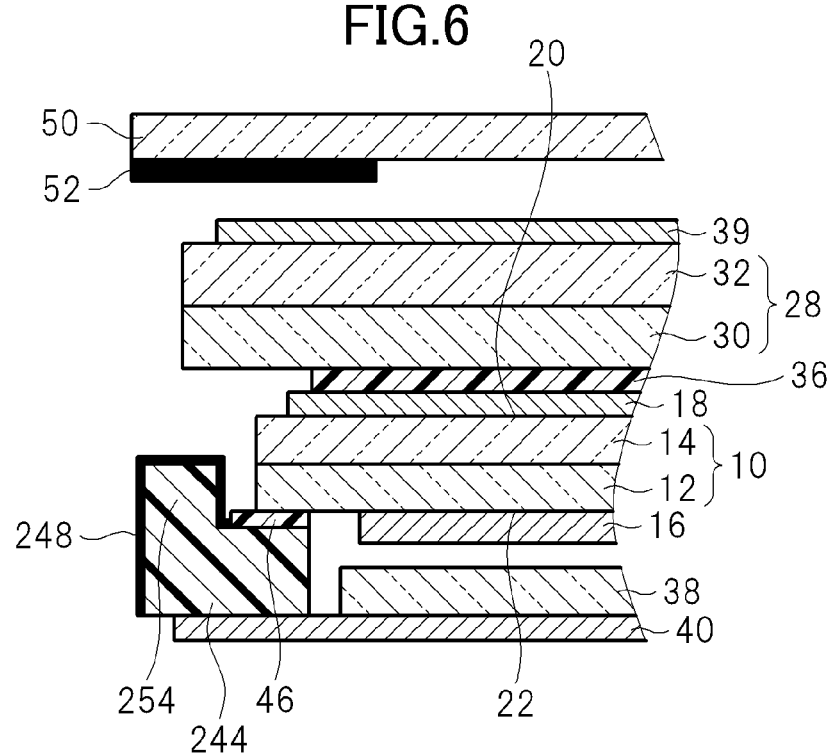
FIG. 6 is a view for explaining a modification 2 of the liquid crystal display device according to the embodiment of the present invention.

FIG. 6 is a view for explaining a modification 2 of the liquid crystal display device according to the embodiment of the present invention. In this modification, on a portion of a body 244 projecting outwardly from the liquid crystal display panel 10, a projecting portion 254 which projects upwardly from a surface of the body 244 supporting the liquid crystal display panel 10 is formed. The projecting portion 254 is positioned on a side of the liquid crystal display panel 10. A light blocking film 248 is formed in a region including a side surface and an upper surface of the projecting portion 254.

Figure 7:
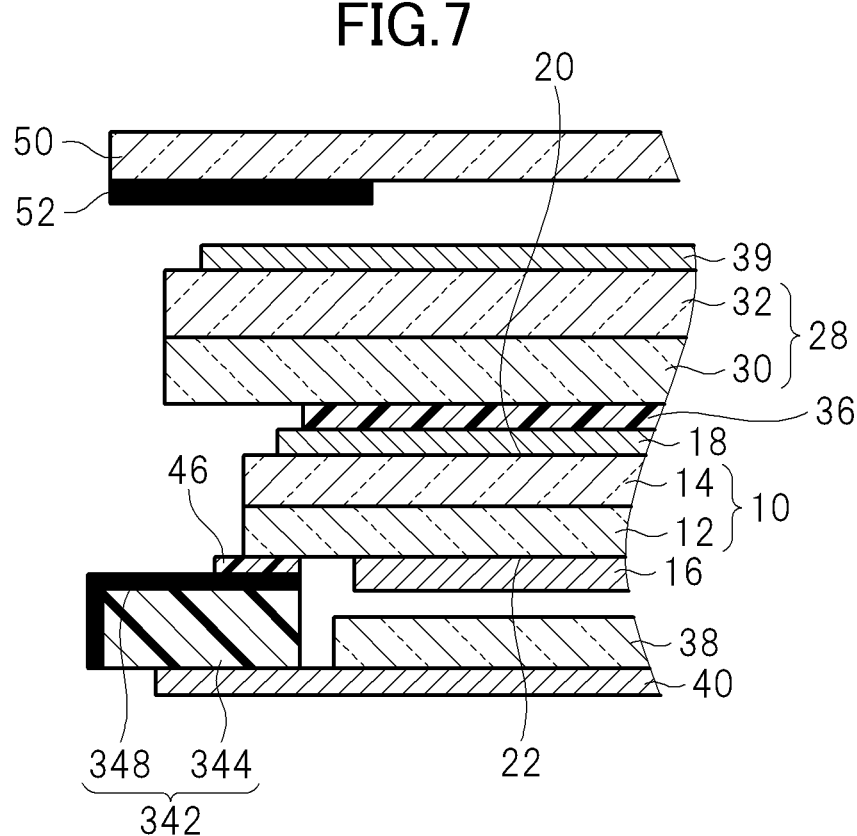
FIG. 7 is a view for explaining a modification 3 of the liquid crystal display device according to the embodiment of the present invention.

FIG. 7 is a view for explaining a modification 3 of the liquid crystal display device according to the embodiment of the present invention. In this modification, a light blocking film 348 is formed on an outer side surface (a surface on a side opposite to a surface which faces the light guide plate 38 in an opposed manner) of a body 344. Further, the light blocking film 348 is formed on the whole upper surface (a surface facing the light transmitting substrate 50) of the body 344. Here, the light blocking film 348 is formed while avoiding a surface of the body 344 which faces the light guide plate 38 in an opposed manner and a lower surface (a surface facing a side opposite to the light transmitting substrate 50) of the body 344. The liquid crystal display panel 10 is adhered to a frame 342 by the light blocking double-sided adhesive tape 46, and the light blocking film 348 is arranged on the double-sided adhesive tape 46 in an overlapping manner. The light blocking film 348 is formed of a light blocking film.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a liquid crystal display panel which has a display screen and a back surface on a side opposite to the display screen;
   a parallax barrier liquid crystal panel which is arranged on a display screen side of the liquid crystal display panel in an overlapping manner;
   a light transmitting substrate which is arranged on the parallax barrier liquid crystal panel in an overlapping manner on a side opposite to the liquid crystal display panel;
   a light blocking frame which is formed on the light transmitting substrate in a state where the light blocking frame surrounds a display region of the liquid crystal display panel;
   a backlight which is arranged on a back surface side of the liquid crystal display panel and includes a light guide plate; and
   a frame which is positioned in a state where the frame faces an end surface of the light guide plate in an opposed manner, supports an edge portion of the liquid crystal display panel on the back surface side of the liquid crystal display panel, and includes a portion projecting outwardly from the liquid crystal display panel, wherein
   the light blocking frame is formed so as to cover a portion of the frame which is arranged adjacent to the light guide plate and a portion of the frame outside the portion, and
   the frame includes a body made of a material which reflects some of light incident on the body and allows some of the light to pass through the body, and a light blocking film which is formed at least on a portion of a surface of the body on a liquid-crystal-display-panel side which projects from the liquid crystal display panel while avoiding a surface of the body which faces the light guide plate in an opposed manner.

2. The liquid crystal display device according to claim 1, wherein the body includes a projecting portion projecting upwardly from the surface of the body which supports the liquid crystal display panel on a portion thereof projecting from the liquid crystal display panel, the projecting portion is positioned on a side of the liquid crystal display panel, and
   the light blocking film is formed in a region which includes a side surface and an upper surface of the projecting portion.

3. The liquid crystal display device according to claim 1, wherein the light blocking film is formed on the whole body while avoiding the surface of the body which faces the light guide plate in an opposed manner.

4. The liquid crystal display device according to claim 1, wherein the liquid crystal display device further includes a light blocking double-sided adhesive tape for adhering the liquid crystal display panel to the frame, and the light blocking film is formed in an overlapping manner with the double-sided adhesive tape.

5. The liquid crystal display device according to claim 1, wherein the liquid crystal display device further includes a light blocking double-sided adhesive tape for adhering the liquid crystal display panel to the frame, and the light blocking film is formed while avoiding the overlapping of the light blocking film with the double-sided adhesive tape.

6. The liquid crystal display device according to claim 1, wherein one polarizer is used in common as a polarizer of the liquid crystal display panel on a parallax barrier liquid crystal panel side and as a polarizer of the parallax barrier liquid crystal panel on a liquid crystal display panel side, and the light blocking frame is formed in a state where the light blocking frame covers a fringe portion of the polarizer which is used in common.

* * * * *